United States Patent
Moriya et al.

(10) Patent No.: US 8,306,715 B2
(45) Date of Patent: Nov. 6, 2012

(54) LOCK-UP CLUTCH CONTROLLER

(75) Inventors: Naoto Moriya, Toyota (JP); Yoshio Hasegawa, Chiryu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 267 days.

(21) Appl. No.: 12/719,883

(22) Filed: Mar. 9, 2010

(65) Prior Publication Data
US 2010/0235062 A1 Sep. 16, 2010

(30) Foreign Application Priority Data

Mar. 13, 2009 (JP) ................................. 2009-061238

(51) Int. Cl.
*F16H 47/00* (2006.01)
(52) U.S. Cl. ............. 701/68; 192/3.28; 475/43; 475/65; 475/308; 475/314; 475/320; 475/326
(58) Field of Classification Search .................... 701/67, 701/68, 70, 71, 74, 82, 90; 477/5, 6, 8, 13, 477/39, 57, 62, 70, 74, 77, 79, 82–88, 166, 477/171, 176, 179–181; 192/3.21–3.55, 192/12 R, 13 A, 16, 20, 30 R, 48, 53–56, 192/85; 475/8, 43, 65, 67, 86, 95, 96, 99–101, 475/103, 105, 116, 138, 140, 157, 175, 231, 475/233, 258, 259, 261, 262, 269, 308, 314, 475/320, 326; 254/106, 299–301; 188/291; 280/192, 238
See application file for complete search history.

(56) References Cited

U.S. PATENT DOCUMENTS

| | | | | |
|---|---|---|---|---|
| 4,953,677 | A | * | 9/1990 | Aoki et al. ...................... 192/3.3 |
| 2009/0143189 | A1 | * | 6/2009 | Hasegawa et al. ................. 477/5 |
| 2009/0248266 | A1 | * | 10/2009 | Oue et al. ......................... 701/68 |

FOREIGN PATENT DOCUMENTS

| JP | 05-149423 | 6/1993 |
|---|---|---|
| JP | 3453941 | 10/2003 |
| JP | 2004-263780 | 9/2004 |
| JP | 2005-061336 | 3/2005 |
| JP | 2005/113993 | 4/2005 |
| JP | 2006-125629 | 5/2006 |

* cited by examiner

*Primary Examiner* — Mary Cheung
(74) *Attorney, Agent, or Firm* — Finnegan, Henderson, Farabow, Garrett & Dunner, LLP

(57) ABSTRACT

A controller has a command section, a control section, a time measurement section, and a command fixing section. The command section generates a command regarding the actuation state of a lock-up clutch in accordance with a condition value that is determined by the accelerator operating amount and the vehicle speed. The time measurement section starts to measure time when the accelerator operating amount drops to 0 with the current condition value maintained in a hysteresis range and the command section generates the acceleration slip executing command. When the accelerator operating amount is increased from 0, the time measurement section stops the measurement of time and resets the measured time to 0. The command fixing section fixes the command of the command section as an acceleration slip executing command in the period from when the time measurement by the time measurement section has started to when the measured time reaches a determination value. When the accelerator operating amount is increased from 0 or the time measured by the time measurement section reaches the determination value, the command fixing section cancels the fixation of the acceleration slip executing command.

4 Claims, 7 Drawing Sheets

| Actuation state of Lock-up Clutch | Commands | | | |
|---|---|---|---|---|
| | Direct Engagement | Disengagement | Deceleration Slip | Acceleration Slip |
| Directly Engaged State | Execution | Stop | Stop | Stop |
| Disengaged State | Stop | Execution (Stop) | Stop | Stop |
| Deceleration Slip State | Stop | Stop | Execution | Stop |
| Acceleration Slip State | Stop | Stop | Stop | Execution |

Fig.4

| | Regions in which Accelerator Operating Amount and Vehicle Speed |
|---|---|
| Direct Engagement Executing Command | In Direct Engagement Range A |
| Direct Engagement Stopping Command | Outside Direct Engagement Range A |
| Disengagement Executing Command | In Disengagement Range B |
| Disengagement Stopping Command | Outside Disengagement Range B |
| Deceleration Slip Executing Command | In Deceleration Slip Range C |
| Deceleration Slip Stopping Command | Outside Deceleration Slip Range C |
| Acceleration Slip Executing Command | In Range D1 of Acceleration Slip Range D In Hysteresis Range D2 (D1 → D2) |
| Acceleration Slip Stopping Command | Outside Acceleration Slip Range D In Hysteresis Range D2 (B, C → D2) |

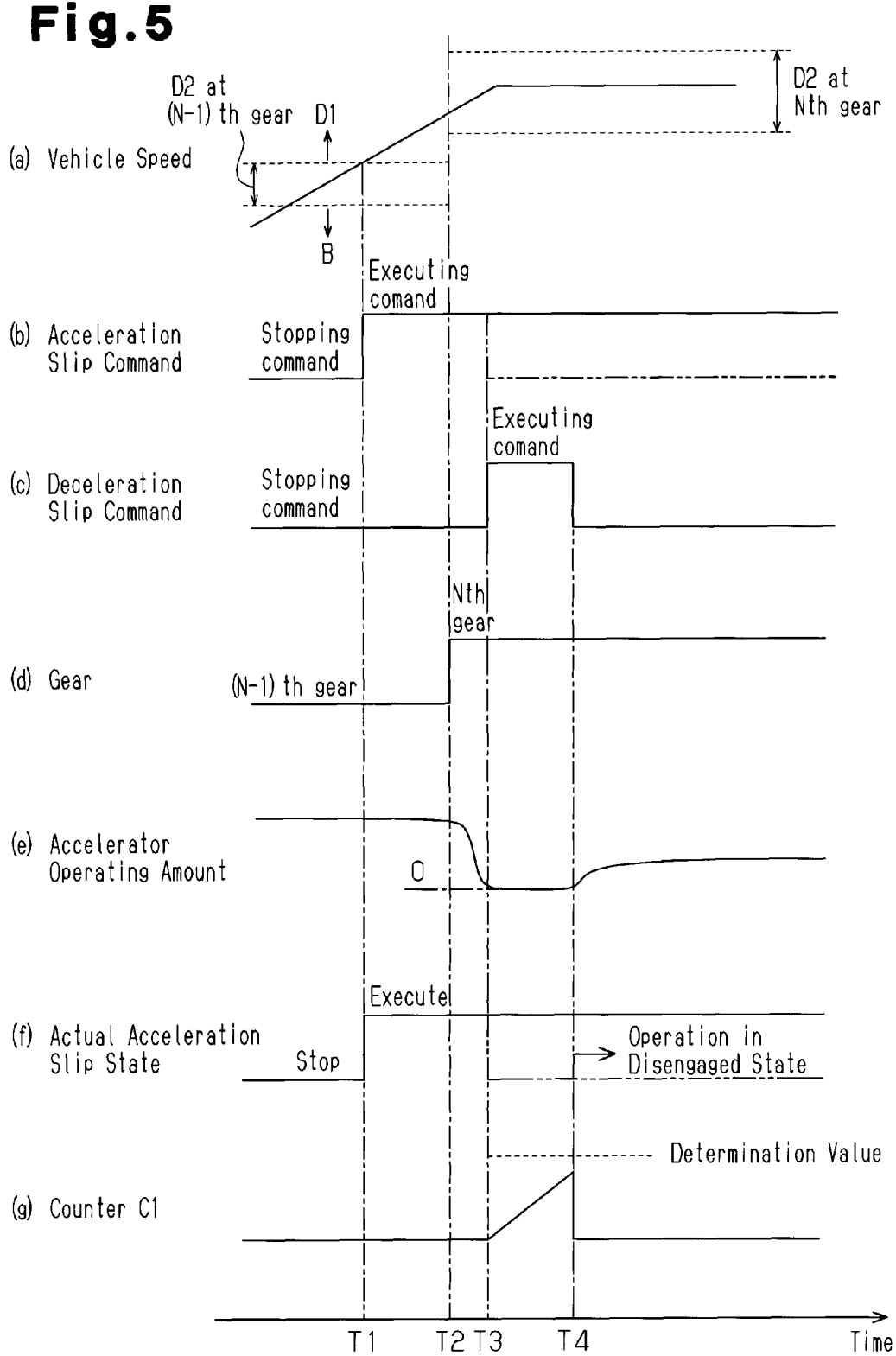

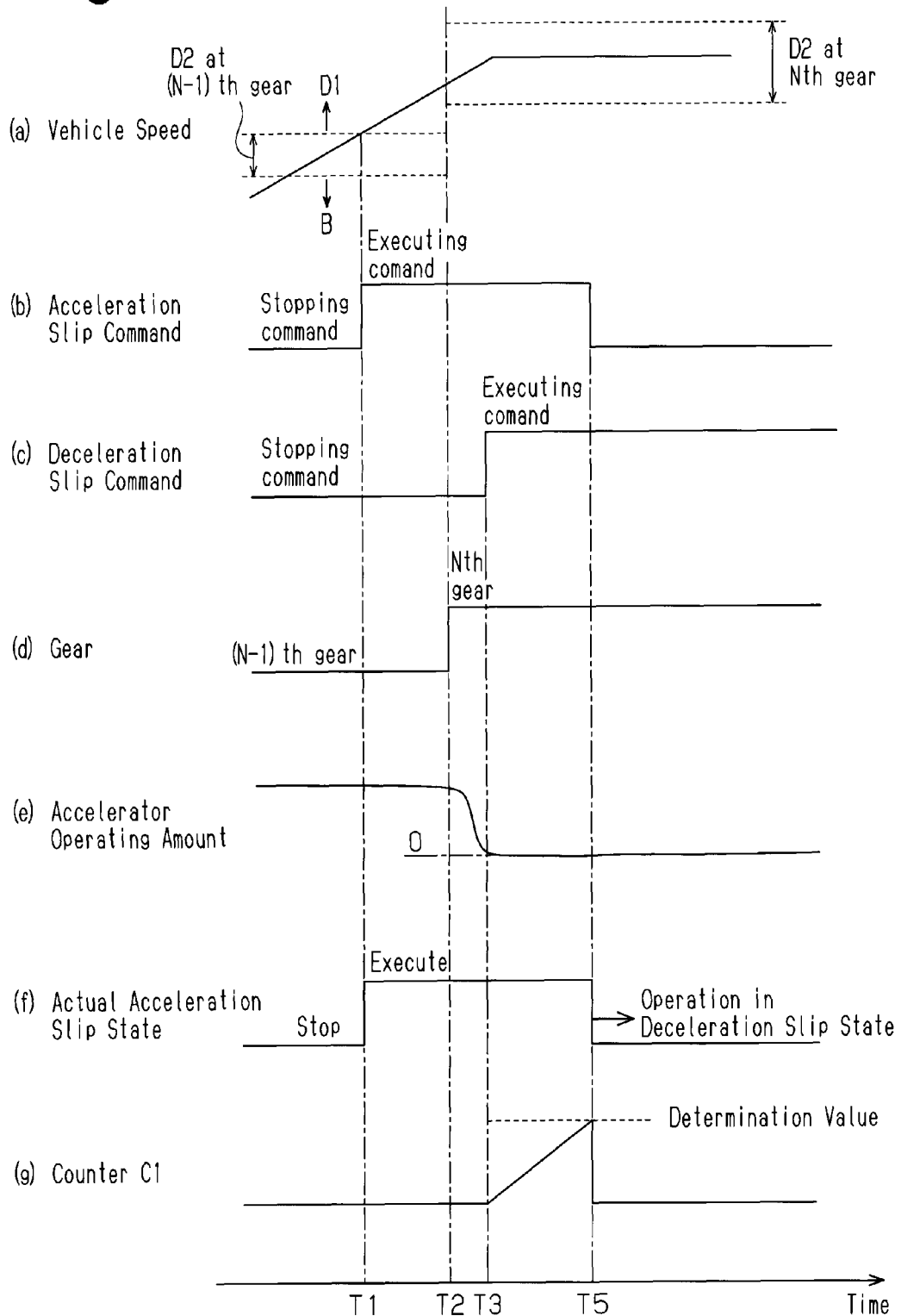

LOCK-UP CLUTCH CONTROLLER

BACKGROUND OF THE INVENTION

The preset invention relates to a lock-up clutch controller.

A vehicle such as an automobile described in Japanese Laid-Open Patent Publication No. 2006-125629 includes a torque converter, a lock-up clutch, and a controller. The torque converter transmits power between the engine and the transmission through fluid. The lock-up clutch is capable of engaging the engine side components of the torque converter directly with the transmission side components of the torque converter. The controller controls operation of the lock-up clutch. To control the operation of the lock-up clutch, the controller switches the lock-up clutch to one of a directly engaged state, a disengaged state, and a slip state. The slip state of the lock-up clutch includes a deceleration slip state and an acceleration slip state. Specifically, the deceleration slip state of the lock-up clutch is for when the depression amount of the accelerator pedal (the accelerator operating amount) is 0 and the acceleration slip state of the lock-up clutch is for when the accelerator operating amount is greater than 0.

In control of the operation of the lock-up clutch, a direct engagement range, a disengagement range, an acceleration slip range, and a deceleration slip range are set in correspondence with the accelerator operating amount and the vehicle speed. In the direct engagement range, the lock-up clutch is in the directly engaged state. In the disengagement range, the lock-up clutch is in the disengaged state. In the deceleration and acceleration slip states, the lock-up clutch is in the slip state. The lock-up clutch is switched to one of the directly engaged state, the disengaged state, and the slip state depending on which of these ranges a condition value that is determined by the current accelerator operating amount and vehicle speed falls in. The direct engagement range, the disengagement range, the acceleration slip range, and the deceleration slip range are set, for example, in the manners described below. Specifically, the direct engagement range is set for a high vehicle speed range. The disengagement range is set for a low vehicle speed range. The acceleration slip range is set between the direct engagement range and the disengagement range. The deceleration slip range is the range corresponding to the accelerator operating amount 0 and set adjacent to the acceleration slip range and the direct engagement range on the decreasing side of the accelerator operating amount.

Specifically, the direct engagement range and the disengagement range are set for the high vehicle speed range and the low vehicle speed range, respectively, for the purposes described below. One of the purposes is to reduce the fuel consumption of the engine by maintaining the lock-up clutch in the directly engaged state in the broadest possible range to improve the power transmission efficiency. The other purpose is to suppress muffled noise of the engine generated by switching the lock-up clutch to the directly engaged state when the vehicle speed is low. The acceleration slip range is set between the direct engagement range and the disengagement range in order to further reduce the fuel consumption of the engine. Specifically, the power transmission efficiency from the engine to the transmission is maximally enhanced by maintaining the lock-up clutch in the slip state, which is closest possible to the directly engaged state, and enlarging the range of the slip state to cover a range of low vehicle speed with respect to the direct engagement range. The deceleration slip range corresponds to the accelerator operating amount 0 and is set adjacent to the acceleration slip range and the direct engagement range and on the decreasing side of the acceleration operating amount in order to maximize the fuel saving effect through the engine fuel cut-off.

The engine fuel cut-off is carried out on condition that the accelerator operating amount is 0 and the engine speed is greater than or equal to a predetermined value. The predetermined value is greater than a target idle speed. Since autonomous operation of the engine is suspended when the fuel cut-off is executed, the engine speed drops to a value less than the predetermined value, which may stop the fuel cut-off. To solve this problem, the lock-up clutch is held in the slip state to ensure power transmission from the wheels to the engine, thus maintaining the engine speed at a value greater than or equal to the predetermined value as long as possible, so that the fuel cut-off can be continued. In order to maximize the saving effect through the fuel cut-off of the engine, the boundary of the deceleration slip range on the lower vehicle speed side is set to correspond to the lowest possible vehicle speed. In this manner, the deceleration slip range is set adjacent to the acceleration slip range and the direct engagement range in a range where the accelerator operating amount is smaller than those of the acceleration slip range and the direct engagement range.

Control of the operation of the lock-up clutch in the acceleration slip range and the proximity of this range will now be explained in detail.

When the condition value determined by the current accelerator operating amount and the current vehicle speed falls in the acceleration slip range, an acceleration slip executing command is generated. In response to the acceleration slip executing command, the lock-up clutch is operated to switch to the acceleration slip state. Accordingly, when the current condition value is in the disengagement range and then moves to the acceleration slip state as the vehicle speed increases, the acceleration slip executing command is generated to operate the lock-up clutch to switch to the acceleration slip state. If the current condition value is outside the acceleration slip range, an acceleration slip stopping command is generated. In response to the acceleration slip stopping command, the lock-up clutch is operated in accordance with the range in which the current condition value exists. Accordingly, for example, when the current condition value is in the acceleration slip range and then moves to the disengagement range as the vehicle speed decreases, the acceleration slip stopping command is generated and the lock-up clutch is operated to switch to the disengaged state.

If the condition value changes frequently between the disengagement range and the acceleration slip range, the activation state of the lock-up clutch changes frequently between the slip state and the disengaged state. This may adversely influence the lock-up clutch. To suppress such frequent changes of the actuation state of the lock-up clutch, a hysteresis range is set in a section of the acceleration slip range corresponding to a relatively low vehicle speed range. If the current condition value is in the hysteresis range, the command regarding the acceleration slip state that was generated immediately before the condition value has entered the hysteresis range is maintained.

In other words, if the current condition value enters the hysteresis range while moving from the section of the acceleration slip range other than the hysteresis range to the disengagement range, the acceleration slip executing command is maintained as long as the condition value is in the hysteresis range. As a result, the actuation state of the lock-up clutch is maintained as the acceleration slip state. If the current condition value enters the hysteresis range while changing from the disengagement range to a range of the acceleration slip range other than the hysteresis range, the acceleration slip stopping command is maintained as long as the condition value is in the hysteresis range. This maintains the lock-up clutch in the disengaged state. In other words, the lock-up clutch is maintained in the disengaged state if the current condition value is in the hysteresis range and the acceleration slip stopping command is generated.

The above-described disadvantage is suppressed by setting the hysteresis range and controlling the actuation state of the lock-up clutch between the acceleration slip state and the disengaged state in correspondence with the acceleration slip executing command or the acceleration slip stopping command, which is maintained when the current condition value enters the hysteresis range. In other words, even when the condition value frequently changes between the disengagement range and the acceleration slip range (the hysteresis range), the lock-up clutch is prevented from changing frequently between the acceleration slip state and the disengaged state. This suppresses the disadvantageous influence of frequent change of the actuation state of the lock-up clutch on the lock-up clutch.

However, with regard to setting of the hysteresis range and the commands regarding the acceleration slip state, the problem described below may occur.

When the current condition value is in the hysteresis range and the acceleration slip execution command has been made, the activation state of the lock-up clutch is maintained in the disengaged state if the accelerator pedal is operated to decrease the accelerator operating amount to 0 and then immediately increase the accelerator operating amount to a value greater than 0, and the condition value is maintained in the hysteresis range thereafter. This increases the fuel consumption of the engine. Specifically, when the accelerator operating amount decreases to 0, the acceleration slip stopping command is generated and the condition value moves from the hysteresis range to the deceleration slip range. Afterwards, the accelerator operating amount becomes a value greater than 0 and the condition value returns from the deceleration slip range to the hysteresis range. In this state, the current condition value is held in the hysteresis range and the acceleration slip stopping command is maintained. That is, when the condition value is in the hysteresis range and the acceleration slip stopping command is generated, the lock-up clutch is in the disengaged state. The lock-up clutch is maintained in the disengaged state as long as the condition value remains in the hysteresis range and the acceleration slip stopping command is maintained, thus lowering the power transmission efficiency between the engine and the transmission. This deteriorates the fuel economy of the engine.

SUMMARY OF THE INVENTION

Accordingly, it is an objective of the present invention to provide a lock-up clutch controller that suppresses the deterioration of the fuel economy of an engine when a condition value determined by a current accelerator operating amount and a current vehicle speed falls in a hysteresis range, which is set in an acceleration slip range.

To achieve the foregoing objective and in accordance with one aspect of the present invention, a controller for a lock-up clutch that is capable of directly engaging an engine-side component of a torque converter mounted in a vehicle with a transmission-side component of the torque converter is provided. A direct engagement range, in which the lock-up clutch is held in a directly engaged state, a disengagement range, in which the lock-up clutch is held in a disengaged state, and an acceleration slip range and a deceleration slip range, in each of which the lock-up clutch is held in a slip state, are set in correspondence with an accelerator operating amount and a vehicle speed. The acceleration slip range is set between the direct engagement range corresponding to higher vehicle speeds and the disengagement range corresponding to lower vehicle speeds. The deceleration slip range is a range corresponding to a state where the accelerator operating amount is 0 and is adjacent to the acceleration slip range. The controller switches the lock-up clutch to one of the directly engaged state, the disengaged state, and the slip states depending on which of the ranges a condition value determined by a current accelerator operating amount and a current vehicle speed falls in. The controller includes a command section, a control section, a time measurement section, and a command fixing section. The command section generates a command regarding an actuation state of the lock-up clutch in accordance with the condition value. The command section generates an acceleration slip executing command when the current condition value is in a range in the acceleration slip range other than a hysteresis range, which is set for lower vehicle speeds in the acceleration slip range. The command section generates an accelerating slip stopping command when the current condition value is outside the acceleration slip range. When the condition value is in the hysteresis range of the acceleration slip range, the command section maintains one of the acceleration slip executing command and the acceleration slip stopping command that was made at the time immediately before the current condition value entered the hysteresis range. The control section controls the actuation state of the lock-up clutch. The control section switches the lock-up clutch to the acceleration slip state when the current condition value is in the acceleration slip range and the command section generates the acceleration slip executing command. The control section switches the lock-up clutch to the disengaged state when the current condition value is in the hysteresis state and the command section generates the acceleration slip stopping command. The time measurement section starts to measure time when the accelerator operating amount drops to 0 in a state where the current condition value is in the hysteresis range and the command section generates the acceleration slip executing command. The time measurement section stops measurement of time and resets the measured time to 0 when the accelerator operating amount is increased to a value greater than 0. The command fixing section fixes the command of the command section as the acceleration slip executing command in the period from when the time measurement section starts the measurement of time to when the time measured by the time measurement section reaches a determination value. The command fixing section cancels the fixation of the acceleration slip executing command when the accelerator operating amount is increased to the value greater than 0 or the measured time reaches the determination value.

Other aspects and advantages of the present invention will become apparent from the following description, taken into conjunction with the accompanying illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a table representing the relationship between the executing and stopping commands illustrated in FIG. 3 and the ranges corresponding to a condition value determined by the current accelerator operating amount and vehicle speed;

FIG. 5 is a timing chart representing changes of the vehicle speed, changes of commands regarding an acceleration slip state, changes of commands regarding a deceleration slip state, changes of transmission gears, changes of the accelerator operating amount, changes of an actual state of the lock-up clutch regarding acceleration slip, and changes of the value of a counter;

FIG. 6 is a timing chart representing changes of the vehicle speed, changes of commands regarding an acceleration slip state, changes of commands regarding a deceleration slip state, change of transmission gears, changes of an accelerator operating amount, changes of an actual state of the lock-up clutch regarding the acceleration slip, and changes of the value of the counter;

DETAILED DESCRIPTION OF THE PREFERRED EMBODIMENTS

A control unit 7 (a command section, a control section, a time measurement section, and a command fixing section) for a lock-up clutch 6 according to one embodiment of the present invention will now be described with reference to FIGS. 1 to 8.

Figure 1:
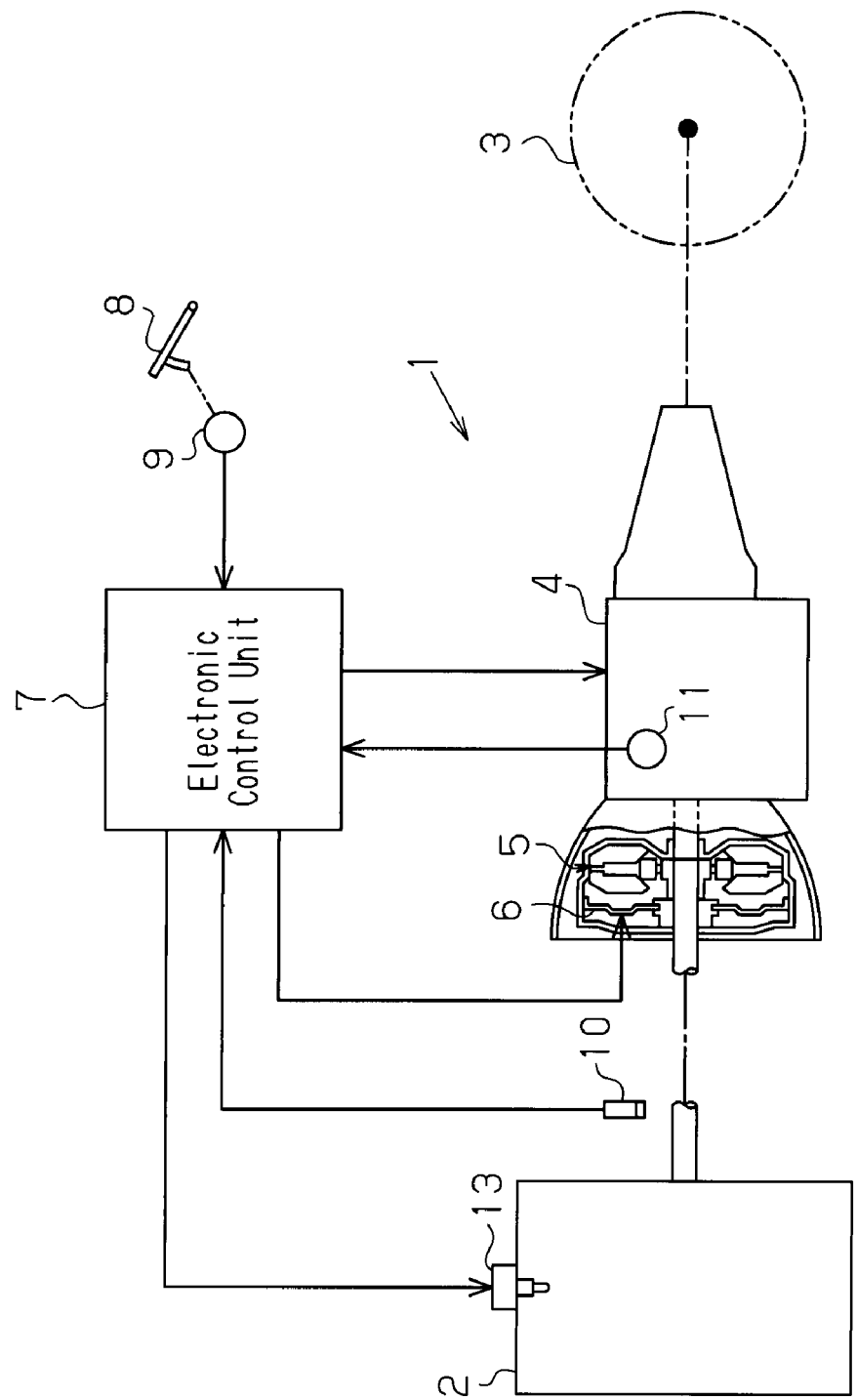
FIG. 1 is a diagram schematically showing the entirety of a vehicle having a lock-up clutch controlled by a controller according to one embodiment of the present invention.

As illustrated in FIG. 1, an automobile 1 has a transmission 4, which is arranged on a power transmission path between and an engine 2 and a wheel 3. Power is thus transmitted between the engine 2 and the wheel 3 through the transmission 4. The transmission 4 has a torque converter 5, which transmits power between the engine 2 and the transmission 4 through oil. The torque converter 5 has a lock-up clutch 6, which engages components (input-side components) of the torque converter 5 corresponding to the engine 2 directly with components (output-side components) of the torque converter 5 corresponding to the transmission 4.

The lock-up clutch 6 is hydraulically actuated. The actuation state of the lock-up clutch 6 is switched between a "directly engaged state" and a "disengaged state". When held in the directly engaged state, the lock-up clutch 6 engages the input-side components of the torque converter 5 directly with the output-side components of the torque converter 5. When held in the disengaged state, the lock-up clutch 6 disengages the torque converter 5 from the engaged state. Alternatively, the lock-up clutch 6 may be switched to a "slip state", which is a state intermediate between the directly engaged state and the disengaged state. When held in the slip state, the lock-up clutch 6 permits rotation of the input-side components of the torque converter 5 relative to the output-side components of the torque converter 5 to a certain extent, thus partially engaging the input-side components with the output-side components of the torque converter 5. When the lock-up clutch 6 is in the slip state, the difference between the input-side rotation speed and the output-side rotation speed of the torque converter 5 is adjusted by controlling the fastening force of the lock-up clutch 6 produced by the hydraulic actuation.

Various types of control on the engine 2, the transmission 4, and the lock-up clutch 6 are executed by the electronic control unit 7, which is mounted in the automobile 1. The electronic control unit 7 receives detection signals from various types of sensors, which are described below.

An accelerator position sensor 9 for detecting the depression amount (the accelerator operating amount) of an accelerator pedal 8.

An engine speed sensor 10 for detecting the engine speed, that is, the input-side rotation speed of the torque converter 5.

A turbine rotation speed sensor 11 for detecting the turbine rotation speed, that is, the output-side rotation speed of the torque converter 5.

The electronic control unit 7 controls the fuel injection amount through actuation of a fuel injection valve 13, which is formed in the engine 2, to control operation of the engine 2. Through such control of the fuel injection amount, the output of the engine 2 is regulated. When the automobile 1 decelerates with the accelerator operating amount maintained as 0 (the accelerator pedal 8 maintained in a released state) and the engine speed is greater than or equal to a predetermined value (which is, for example, a value higher than a target idle speed to a certain extent), the fuel injection valve 13 is controlled in such a manner that the fuel injection amount drops to 0. In this manner, a fuel cut-off is carried out in order to reduce the fuel consumption of the engine 2. The fuel cut-off is suspended when the accelerator pedal 8 is depressed to generate a request of output with respect to the engine 2 or the engine speed decreases to a value less than the predetermined value.

The electronic control unit 7 shifts the gear of the transmission 4 to a gear suitable for a driver's request of acceleration (the accelerator operating amount) and the traveling state (the vehicle speed) of the automobile 1, based on the accelerator operating amount and the vehicle speed of the automobile 1. The vehicle speed is determined by the turbine rotation speed and the current gear of the transmission 4. The gear of the transmission 4 is shifted, for example, as will be described below. Specifically, when the driver's request of acceleration (the accelerator operating amount) is great, the transmission 4 is shifted to a lower gear. When the accelerator operating amount is decreased to 0 and the request of acceleration is canceled so that the engine speed drops, the transmission 4 is shifted to a higher gear. If the accelerator operating amount is maintained at a value slightly greater than 0, the transmission 4 is prevented from shifting to a lower gear so that the vehicle speed is increased. The increase in the vehicle speed shifts the transmission 4 to a higher gear in some cases.

The electronic control unit 7 hydraulically drives the lock-up clutch 6 and switches the actuation state of the lock-up clutch 6 among the "directly engaged state", the "disengaged state", and the "slip state" based on the accelerator operating amount and the vehicle speed. The slip state of the lock-up clutch 6 includes a "deceleration slip state" and an "acceleration slip state". Specifically, the deceleration slip state of the lock-up clutch 6 is for a case where the accelerator operating amount is 0 and the acceleration slip state of the lock-up clutch is for a case where the accelerator operating amount is greater than 0.

To control the operation of the lock-up clutch 6, a direct engagement range for engaging the lock-up clutch 6, a disengagement range for disengaging the lock-up clutch 6, and an acceleration slip range and a deceleration slip range for holding the lock-up clutch 6 in the slip state are set each according to the accelerator operating amount and the vehicle speed. The lock-up clutch 6 is then switched to one of the directly engaged state, the disengaged state, and the slip state depending on which of these ranges a condition value determined by the current accelerator operating amount and vehicle speed falls in.

Figures 2, 3:
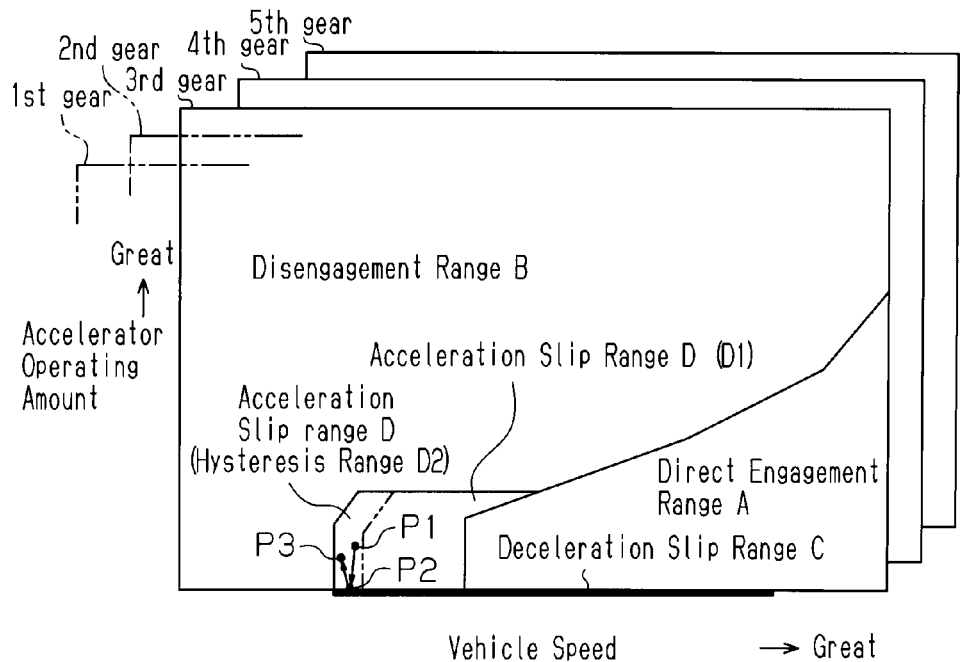
FIG. 2 is a diagram illustrating a direct engagement range, a disengagement range, an acceleration slip range, and a deceleration slip range, which are set based on an accelerator operating amount and a vehicle speed.
FIG. 3 is a table representing the relationship between the activation state of the lock-up clutch and various executing and stopping commands regarding the actuation state of the lock-up clutch.

The direct engagement range, the disengagement range, the acceleration slip range, and the deceleration slip range are set based on the accelerator operating amount and the vehicle speed as illustrated in, for example, the graph of FIG. 2. With reference to FIG. 2, the direct engagement range A is set in a high vehicle speed range and the disengagement range B is set in a low vehicle speed range. The acceleration slip range D is set between the direct engagement range A and the disengagement range B. The deceleration slip range C corresponds to the accelerator operating amount 0 and is set adjacent to the acceleration slip range D and the direct engagement range A and on the decreasing side of the accelerator operating amount.

Specifically, the direct engagement range A and the disengagement range B are set for the high vehicle speed range and the low vehicle speed range, respectively, for the purposes described below. One of the purposes is to reduce the fuel consumption of the engine 2 by improving the power transmission efficiency by holding the lock-up clutch 6 in the directly engaged state in the broad possible range. Another purpose is to suppress muffled noise generated by the engine 2 when the lock-up clutch 6 is held in the directly engaged state in the low vehicle speed range. The acceleration slip range D is set between the direct engagement range A and the disengagement range B in order to further reduce the fuel consumption of the engine 2. This is achieved by maximizing the power transmission efficiency from the engine 2 to the transmission 4 by maintaining the lock-up clutch 6 in the slip state, which is closest possible to the directly engaged state, in an enlarged low vehicle speed range with respect to the direct engagement range A. Further, to obtain a maximum fuel saving effect through fuel cut-off of the engine 2, the deceleration slip range C corresponds to the accelerator operating amount 0 and is set adjacent to the acceleration slip range D and the direct engagement range A on the decreasing side of the accelerator operating amount.

As has been described, the fuel cut-off of the engine 2 is carried out on condition that the accelerator operating amount is 0 and that the engine speed is greater than or equal to the predetermined value greater than the target idle speed. When the fuel cut-off is executed, autonomous operation of the engine 2 is stopped. This decreases the engine speed to a value less than the predetermined value, which may stop the fuel cut-off. To solve this problem, the power is transmitted from the wheel 3 to the engine 2 with the lock-up clutch 6 maintained in the slip state. This maintains the engine speed greater than or equal to the predetermined value as long as possible, thus allowing the fuel cut-off to continue. In order to obtain the maximum fuel saving effect through the fuel cut-off of the engine 2, the boundary of the deceleration slip range C on the lower vehicle speed side is set in such a manner as to correspond to the lowest possible vehicle speed. Accordingly, the deceleration slip range C is set adjacent to the acceleration slip range D and the direct engagement range A as viewed in the decreasing direction of the accelerator operating amount.

Control of the operation of the lock-up clutch 6 will hereafter be explained in detail.

The operation of the lock-up clutch 6 is controlled, or switched among the directly engaged state, the disengaged state, the acceleration slip state, and the deceleration slip state in response to various executing and stopping commands regarding these states. Specifically, as the executing and stopping commands regarding the directly engaged state of the lock-up clutch 6, a direct engagement executing command and a direct engagement stopping command are selectively generated. As the executing and stopping commands regarding the disengaged state of the lock-up clutch 6, a disengagement executing command and a disengagement stopping command are selectively generated. As the executing and stopping commands regarding the deceleration slip state of the lock-up clutch 6, a deceleration slip executing command and a deceleration slip stopping command are selectively generated. As the executing and stopping commands regarding the acceleration slip state of the lock-up clutch 6, an acceleration slip executing command and an acceleration slip stopping command are selectively generated.

FIG. 3 is a table representing the relationship between the aforementioned various executing and stopping commands and the actuation state of the lock-up clutch 6. With reference to FIG. 3, the operation of the lock-up clutch 6 is controlled to switch to the directly engaged state, the disengaged state, the deceleration slip state, and the acceleration slip state in response to the various executing commands and stopping commands described below.

Specifically, the lock-up clutch 6 is controlled to switch to the directly engaged state when the direct engagement executing command, the disengagement stopping command, the deceleration slip stopping command, and the acceleration slip stopping command are generated simultaneously. The lock-up clutch 6 is controlled to switch to the disengaged state when the direct engagement stopping command, the disengagement executing command, the deceleration slip stopping command, and the acceleration slip stopping command are generated simultaneously. Also, the lock-up clutch 6 is switched to the disengaged state so as to protect the lock-up clutch 6 in a particular situation such as when the direct engagement stopping command, the disengagement stopping command, the deceleration slip stopping command, and the acceleration slip stopping command are generated simultaneously. The lock-up clutch 6 is controlled to switch to the deceleration slip state when the direct engagement stopping command, the disengagement stopping command, the deceleration slip executing command, and the acceleration slip stopping command are generated simultaneously. The lock-up clutch 6 is controlled to switch to the acceleration slip state when the direct engagement stopping command, the disengagement stopping command, the deceleration slip stopping command, and the acceleration slip executing command are generated simultaneously.

A condition value is determined by the accelerator operating amount and the vehicle speed. Depending on which of the direct engagement range A, the disengagement range B, the deceleration slip range C, and the acceleration slip range D the condition value falls in, as illustrated in FIG. 2, the above-described executing and stopping commands for switching the lock-up clutch 6 to the directly engaged state, the disengaged state, the acceleration slip state, and the deceleration slip state are generated.

Specifically, when the current condition value is in the direct engagement range A, the direct engagement executing command is generated. When the current condition value is outside the direct engagement range A, the direct engagement stopping command is generated. When the current condition value is in the disengagement range B, the disengagement executing command is generated. When the current condition value is outside the disengagement range B, the disengagement stopping command is generated. When the current condition value is in the deceleration slip range C, the deceleration slip executing command is generated. When the current condition value is outside the deceleration slip range C, the deceleration slip stopping command is generated. The acceleration slip executing command is generated basically when the current condition value is in the acceleration slip range D. The acceleration slip stopping command is generated basically when the current condition value is outside the acceleration slip range D.

The direct engagement range A, the disengagement range B, the deceleration slip range C, and the acceleration slip range D are set in correspondence with the gears (in the present embodiment, the first to fifth ranges) of the transmission 4 as suitable ranges for the corresponding gears.

When the condition value changes frequently between the disengagement range B and the acceleration slip range D, the actuation state of the lock-up clutch 6 also changes between the acceleration slip state and the disengaged state. This may adversely influence the lock-up clutch 6. To suppress such frequent change of the actuation state of the lock-up clutch 6, a hysteresis range D2 is set in a section of the acceleration slip range D corresponding to a low vehicle speed range. When the current condition value is in the hysteresis range D2, a command that has been made immediately before the condition value entered the hysteresis range D2 is maintained. In this case, if the current condition value enters the hysteresis range D2 when switching from a range D1, which is a section of the acceleration slip range D other than the hysteresis range D2, to the disengagement range B, the acceleration slip executing command is maintained as long as the condition value remains in the hysteresis range D2. If the current condition value enters the hysteresis range D2 when moving from the disengagement range B to the range D1, the acceleration slip stopping command is maintained as long as the condition value is in the hysteresis range D2.

Like the direct engagement range A, the disengagement range B, the deceleration slip range C, and the acceleration slip range D, the hysteresis range D2 is set in correspondence with the gears of the transmission 4 as suitable ranges for the corresponding gears. Accordingly, for each of the gears of the transmission 4, the acceleration slip range D and the hysteresis range D2 are set mutually offset in a direction of change of vehicle speed change.

FIG. 4 is a table representing the relationship between the above-described executing commands and stopping commands and the ranges in which the current condition value falls in. The executing and stopping commands regarding the actuation state (the directly engaged state, the disengaged state, the deceleration slip state, and the acceleration slip state) of the lock-up clutch 6 are generated when the current condition value falls in the corresponding one of the ranges represented in FIG. 4.

With reference to FIG. 4, the acceleration slip executing command is generated when the current condition value is in the range D1 of the acceleration slip range D or when the condition value enters the hysteresis range D2 after moving from the range D1 to the hysteresis range D2. The acceleration slip stopping command is generated when the current condition value is outside the acceleration slip range D or when the condition value falls in the hysteresis range D2 after moving from the disengagement range B to the hysteresis range D2.

The acceleration slip executing command and the acceleration slip stopping command are generated as illustrated in FIG. 4 depending on whether the current condition value is in the hysteresis range D2, which is set in the acceleration slip range D. In this manner, the operation of the lock-up clutch 6 is controlled in the manners described below. If the current condition value enters the hysteresis range D2 when moving from the range D1, which is the range of the acceleration slip range D other than the hysteresis range D2, to the disengagement range B, the acceleration slip executing command is maintained as long as the condition value is in the hysteresis range D2. As a result, with reference to FIG. 3, the direct engagement stopping command, the disengagement stopping command, the deceleration slip stopping command, and the acceleration slip executing command are generated. This maintains the lock-up clutch 6 in the acceleration slip state. If the current condition value enters the hysteresis range D2 when moving from the disengagement range B to the range D1 of the acceleration slip range D, the acceleration slip stopping command is maintained as long as the condition value is in the hysteresis range D2. As a result, with reference to the table of FIG. 3, the direct engagement stopping command, the disengagement stopping command, the deceleration slip stopping command, and the acceleration slip stopping command are generated, thus maintaining the lock-up clutch 6 in the disengaged state. In other words, when the current condition value is in the hysteresis range D2 and the acceleration slip stopping command is made, the lock-up clutch 6 is in the disengaged state.

Accordingly, even when the condition value changes frequently between the engagement range B and the acceleration slip range D (the hysteresis range D2), the lock-up clutch 6 is prevented from switching frequently between the acceleration slip state and the disengaged state. This suppresses the disadvantageous influence of frequent changes of the actuation state on the lock-up clutch 6.

However, the above-described setting of the hysteresis range D2 and the above-described commanding method regarding the acceleration slip state have a problem as will be described below.

There may be a case in which the current condition value is in the hysteresis range D2 (for example, at the position P1 in FIG. 2) and the acceleration slip executing command is made. The case may occur if, for example, the accelerator operating amount increases to a value greater than 0 so that the current condition value moves from the disengagement range B to the range D1, which is the range of the acceleration slip range D other than the hysteresis range D2, and then the gear is shifted to such a gear that the current condition value is moved to the hysteresis range D2, which corresponds to the gear to which the transmission 4 has been shifted.

In this state, the accelerator operating amount may be dropped to 0 so that the current condition value moves from the position P1 in the hysteresis range D2 to the position P2 in the deceleration slip range C. Immediately afterwards, the accelerator pedal 8 may be operated to raise the accelerator operating amount to a value greater than 0 in such a manner that the current condition value is maintained at the position P3 in the hysteresis range D2. In this case, the lock-up clutch 6 is maintained in the disengaged state for the reason described below. Specifically, when the accelerator operating amount drops to 0 (the position P2), the acceleration slip stopping command is generated and the condition value is moved from the hysteresis range D2 to the deceleration slip range C. Then, when the accelerator operating amount increases to the value greater than 0 and the condition value is returned from the deceleration slip range C to the hysteresis range D2 (the position P3), the current condition value is in the hysteresis range D2 and the acceleration slip stopping command is maintained. That is, with reference to the table of FIG. 3, when the current condition value is in the hysteresis range D2 and the acceleration slip stopping command is generated, the direct engagement stopping command, the disengagement stopping command, the deceleration slip stopping command, and the acceleration slip stopping command are generated. The lock-up clutch 6 is thus held in the disengaged state.

The disengaged state of the lock-up clutch 6 is maintained as long as the current condition value is in the hysteresis range D2 and the acceleration slip stopping command is made. This lowers the power transmission efficiency between the engine 2 and the transmission 4, thus increasing the fuel consumption of the engine 2.

The above-described problem of the present invention is solved as illustrated in the timing charts of FIGS. 5 and 6. The sections (a), (b), (c), (d), (e), and (f) of FIG. 5 represent changes of the vehicle speed, changes of the commands regarding the acceleration slip state, changes of the commands regarding the deceleration slip state, changes of the gears, changes of the accelerator operating amount, and changes of the acceleration slip state of the lock-up clutch 6, respectively.

When the transmission 4 is in the (N−1)th gear and the accelerator pedal 8 is operated to increase the accelerator operating amount to a value greater than 0, thus raising the vehicle speed, the current condition value is moved from the disengagement range B to the range D1, which is the range of the acceleration slip range D other than the hysteresis range D2, thus causing the acceleration slip executing command to be generated (at time point T1). In other words, the command regarding the acceleration slip state of the lock-up clutch 6 is changed from the stopping command to the executing command. In this state, the commands regarding the states of the lock-up clutch 6 other than the acceleration slip state are stopping commands. Accordingly, when the acceleration slip executing command is generated (at time point T1), the lock-up clutch 6 is switched to the acceleration slip state. Afterwards, when the transmission 4 is shifted up from the (N−1)th gear to the Nth gear (at time point T2), the acceleration slip range D including the hysteresis range D2 corresponding to the (N−1)th gear is switched to the acceleration slip range D corresponding to the Nth gear, so that the acceleration slip range D is displaced in the direction of greater vehicle speed. In the example illustrated in FIG. 5, the transmission 4 is shifted up from the (N−1)th gear to the Nth gear (at time point T2), which displaces the acceleration slip range D in the direction of greater vehicle speed.

As the gear of the transmission 4 is shifted and the acceleration slip range D is displaced in the direction of greater vehicle speed, as has been described, the current condition value falls in the hysteresis range D2. In this state, if the driver attempts to switch the vehicle from an accelerating state to a constant traveling speed state, the accelerator operating amount decreases until the vehicle speed becomes constant. However, in recent vehicles, the engine 2 outputs relatively great torque and exhibits relatively small traveling resistance. Accordingly, when the accelerator operating amount is decreased to switch from the accelerating state to the constant traveling speed state, the accelerator pedal 8 may be operated to increase the accelerator operating amount to a value greater than 0 after the accelerator operating amount has been dropped to 0.

In this case, when the accelerator operating amount drops to 0 (at time point T3), the condition value enters the deceleration slip range C. The acceleration slip stopping command and the deceleration slip executing command are thus generated. Specifically, as represented by the double-dotted chain lines in FIG. 5(b), the command regarding the acceleration slip state of the lock-up clutch 6 is switched from the executing command to the stopping command. Further, as represented by the solid lines in FIG. 5(c), the command regarding the deceleration slip state of the lock-up clutch 6 is switched from the stopping command to the executing command. In this state, the command regarding the deceleration slip state of the lock-up clutch 6 is the executing command and the commands regarding the states of the lock-up clutch 6 other than the deceleration slip state are the stopping commands. Accordingly, when the deceleration slip executing command is generated (at time point T3), that is, when the current condition value is in the deceleration slip range C, the lock-up clutch 6 is in the deceleration slip state.

Afterwards, when the accelerator operating amount is raised to a value greater than 0 (at time point T4), the current condition value returns from the deceleration slip range C to the hysteresis range D2, and the command regarding the deceleration slip state is switched from the executing command to the stopping command as represented by the solid lines in FIG. 5(c). In this state, the commands regarding the actuation states of the lock-up clutch 6 (including the directly engaged state, the disengaged state, the deceleration slip state, and the acceleration slip state) are all stopping commands. Accordingly, when the accelerator operating amount increases to the value greater than 0 and the deceleration slip stopping command is generated (at time point T4), the acceleration slip stopping command is generated with the current condition value remaining in the hysteresis range D2. The lock-up clutch 6 is thus switched to the disengaged state. When the current condition value enters and is maintained in the hysteresis range D2, the lock-up clutch 6 is maintained in the disengaged state. This lowers the power transmission efficiency between the engine 2 and the transmission 4. This increases the fuel consumption of the engine 2.

To solve this problem, in the present embodiment, time measurement is started when the accelerator operating amount becomes 0 with the current condition value maintained in the hysteresis range D2 and the acceleration slip executing command maintained. The time measurement is ended and reset to 0 when the accelerator operating amount is increased to a value greater than 0. Specifically, as illustrated in FIG. 5(g), when the accelerator operating amount decreases to 0 (at time point T3), a counter C1 starts to count up. That is, the counter C1 counts up 1 by 1 for every constant time interval. In this manner, the counter C1 measures the time that elapses since the accelerator operating amount becomes 0. When the accelerator operating amount is increased to the value greater than 0, the counter C1 ends counting up and resets the counter C1 to 0. Further, until the time represented by the counter C1, which is the time that elapses since the accelerator operating amount has dropped to 0, reaches a determination value, the command regarding the acceleration slip state of the lock-up clutch 6 is fixed as the acceleration slip executing command as represented by the solid lines in FIG. 5(b) from time point T3. When the accelerator operating amount increases to the value greater than 0 (at time point T4) or the time represented by the counter C1 reaches the determination value, fixation of the acceleration slip executing command is canceled.

In this case, as long as the time measured by the counter C1 is less than the determination value, the command regarding the acceleration slip state of the lock-up clutch 6 is fixed as the acceleration slip executing command as represented by the solid line in FIG. 5(b) from time point T3, even when the accelerating operating amount is 0 and the current condition value is in the deceleration slip range C. In this state, although the deceleration slip executing command and the acceleration slip executing command are both generated, which does not happen normally, the lock-up clutch 6 is prevented from being actuated to switch from the current actuation state to another actuation state. Accordingly, the lock-up clutch 6 is maintained in the current actuation state, which is the acceleration slip state, and prevented from switching to the disengaged state. Before the time represented by the counter C1 reaches the determination value, the accelerator pedal 8 may be operated to increase the accelerator operating amount to a value greater than 0 so that the condition value is returned from the deceleration slip range C to the hysteresis range D2. In this case, the current condition value falls in the hysteresis range D2 and the acceleration slip executing command is made (as represented by the solid lines in FIG. 5(*b*) from time point T4). The lock-up clutch 6 is thus maintained in the acceleration slip state. In this state, the lock-up clutch 6 is prevented from switching to the disengaged state. Accordingly, even if the condition value is maintained in the hysteresis range D2 after having been returned to the hysteresis range D2 from the deceleration slip range C, the lock-up clutch 6 is maintained in the disengaged state, thus preventing the fuel consumption of the engine 2 from increasing.

If the accelerator operating amount is maintained at 0 in the period from when the accelerator operating amount has reached 0 to when the time represented by the counter C1 reaches the determination value, the commands regarding the actuation state of the lock-up clutch 6 are generated as will hereafter be explained with reference to the flowchart of FIG. 6. Like the timing charts of sections (a) to (g) of FIG. 5, the timing charts of sections (a), (b), (c), (d), (e), (f), and (g) of FIG. 6 represent changes of the vehicle speed, changes of the commands regarding the acceleration slip state, changes of the commands regarding the deceleration slip state, changes of the gears, changes of the accelerator operating amount, changes of the actual state of the lock-up clutch 6 regarding the acceleration slip, and changes of the count of the counter C1, respectively.

As illustrated in FIG. 6, if the accelerator operating amount is maintained at 0 after becoming 0 at time point T3 and the time represented by the counter C1 reaches the determination value (at the timing T5), the counter C1 is reset to 0 and fixation of the acceleration slip executing command of the lock-up clutch 6 is canceled. Since the accelerator operating amount is 0 when the fixation of the acceleration slip executing command is canceled, the current condition value is in the deceleration slip range C. Accordingly, the deceleration slip executing command is generated while the acceleration slip stopping command is produced. Specifically, the command regarding the deceleration slip state of the lock-up clutch 6 is maintained as the executing command as represented by the solid lines in FIG. 6(*c*). Further, the command regarding the acceleration slip state of the lock-up clutch 6 is changed from the executing command to the stopping command as represented by the solid lines in FIG. 6(*b*). In this state, the command regarding the deceleration slip state of the lock-up clutch 6 is the executing command and the commands regarding the states of the lock-up clutch 6 other than the deceleration slip state are the stopping commands. The lock-up clutch 6 is thus in the disengaged state.

Figure 7:
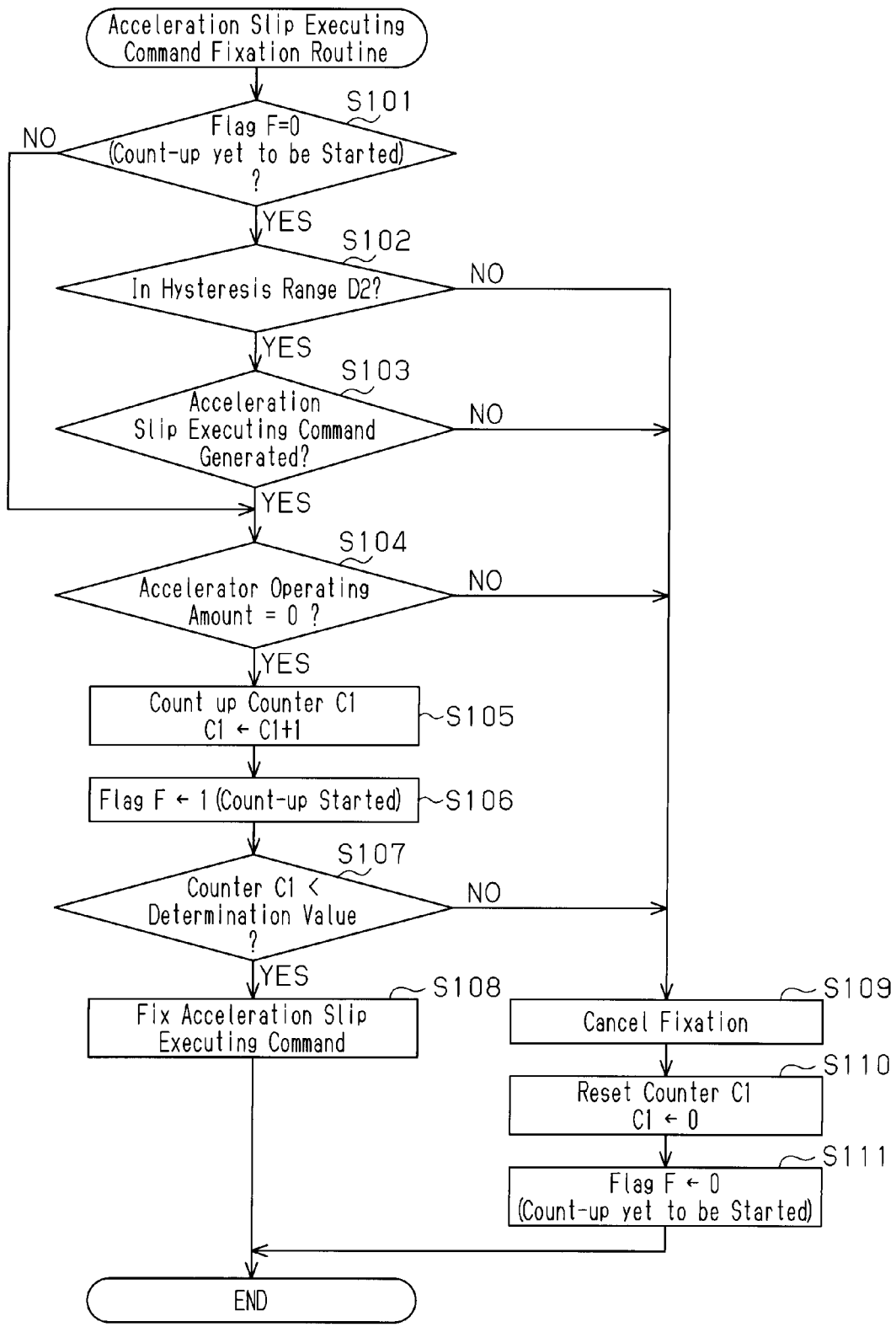
FIG. 7 is a flowchart representing a procedure for fixing and canceling fixation of an acceleration slip executing command.

Next, the fixation of the acceleration slip executing command and cancelation of the fixation will be explained in detail with reference to the flowchart of FIG. 7. FIG. 7 represents a routine for fixing the acceleration slip executing command. The routine is carried out by the electronic control unit 7 periodically, for example, in a manner interrupting at predetermined time intervals.

With reference to a flag F, it is determined whether the counter C1 has started to count up. As illustrated in FIG. 7, it is first determined whether the flag F is 0 (indicating that the counter C1 has not yet started to count up) (in step S101). If the flag F is 0, that is, if a positive determination is made in step S101, subsequent determinations are carried out sequentially in the manner described below. Specifically, it is determined whether the current condition value is in the hysteresis range D2 (in step S102). It is then determined whether the acceleration slip executing command has been made (in step S103). Next, it is determined whether the accelerator operating amount is 0 (in step S104). If the determinations of steps S101 to S104 are all positive, it is indicated that the accelerator operating amount has dropped to 0 with the current condition value maintained in the hysteresis range D2 and the acceleration slip executing command maintained. In this case, the counter C1 counts up by 1 and then the flag F is set to 1 (indicating that the counter C1 has started to count up) (in step S105). As the flag F is set to 1 in this manner, a negative determination is made in step S101 in a subsequent cycle of the routine. Accordingly, step S104 is carried out without executing steps S102 and S103.

Figure 8:
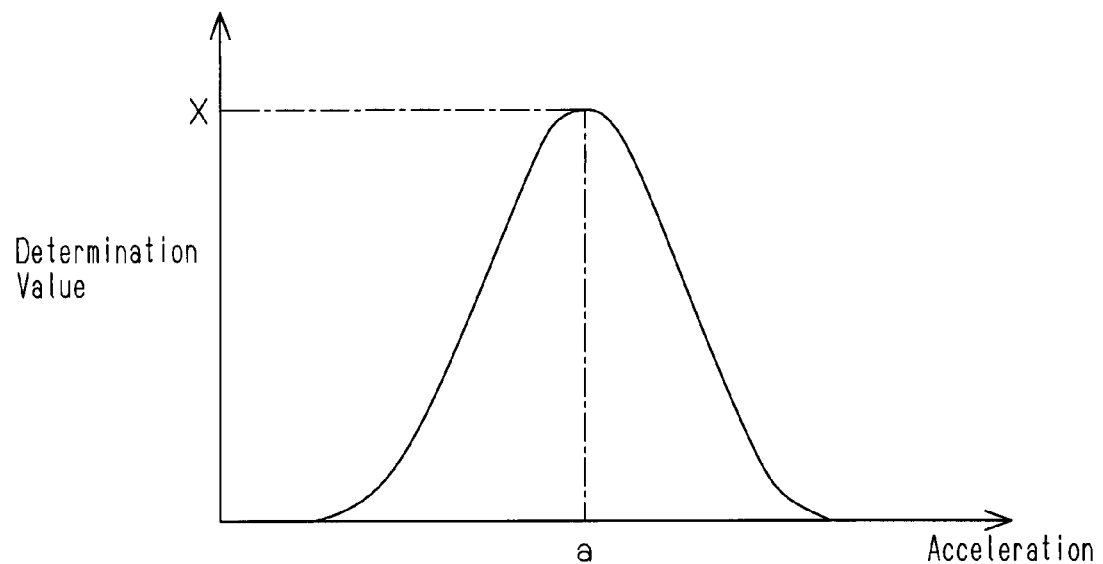
FIG. 8 is a graph representing change of a determination value with respect to change of acceleration of the vehicle.

After the flag F is set to 1, determination whether the count of the counter C1 is smaller than the determination value (in step S107) is performed as long as the accelerator operating amount is 0 (YES in step S104). As illustrated in FIG. 8, the determination value is set according to the acceleration of the vehicle, which is detected based on the vehicle speed. With reference to FIG. 8, the determination value reaches a maximum value X when the acceleration of the vehicle reaches the most frequent acceleration, which is an acceleration a that is detected most frequently in its range of changes. In other words, when the acceleration of the vehicle is smaller than the acceleration a, the determination value become greater as the acceleration becomes higher. When the acceleration of the vehicle is greater than the acceleration a, the determination value becomes smaller as the acceleration becomes higher.

If it is determined that the count of the counter C1 is smaller than the determination value in step S107, the command regarding the acceleration slip state of the lock-up clutch 6 is fixed as the acceleration slip executing command (in step S108). Contrastingly, if it is determined that the count of the counter C1 is greater than or equal to the determination value, fixation of the acceleration slip executing command is canceled (in step S109). Afterwards, the counter C1 is reset to 0 (in step S110) and the flag F is set to 0 (indicating that the counter C1 has not yet started to count up) (in step S111). If a negative determination is made in any one of steps S102, S103, and S104, the fixation of the acceleration slip executing command is canceled (in step S109), the counter C1 is reset to the initial value 0 (in step S110), and the flag F is set to 0 (in step S111).

The present embodiment has the following advantages.

(1) If the accelerator operating amount is decreased to 0 when the current condition value is in the hysteresis range D2 and the acceleration slip executing command is generated, the counter C1 starts counting up at the predetermined time cycles to measure the time that elapses since the accelerator operating amount drops to 0. When the accelerator operating amount is increased from 0, the counter C1 stops counting up and resets its count to 0. Until the time represented by the counter C1, which is the time that elapses since the accelerator operating amount decreases to 0, reaches the determination value, the command regarding the acceleration slip state of the lock-up clutch 6 is fixed as the executing command. Afterwards, when the accelerator operating amount becomes greater than 0 or when the time represented by the counter C1 reaches the determination value, the fixation of the acceleration slip executing command is canceled.

As long as the time represented by the counter C1 is less than the determination value, the command regarding the acceleration slip state of the lock-up clutch 6 is fixed as the executing command even when the accelerator operating amount is 0 and the current condition value is in the deceleration slip range C. In this state, the deceleration slip executing command and the acceleration slip executing command are both generated, which does not happen normally. However, since the lock-up clutch 6 is maintained in the current actuation state, which is the acceleration slip state, the lock-up clutch 6 is prevented from switching to the disengaged state. If the accelerator operating amount changes and the actuation state of the lock-up clutch 6 returns from the state of the deceleration slip range C to the state of the hysteresis range D2 before the time represented by the counter C1 becomes greater than or equal to the determination value, the current condition value is in the hysteresis range D2 and the acceleration slip executing command is made. The lock-up clutch 6 is thus maintained in the acceleration slip state. This prevents the lock-up clutch 6 from being switched to the disengaged state. Accordingly, even if the condition value is maintained in the hysteresis range D2 after having returned from the deceleration slip range C to the hysteresis range D2, the fuel consumption of the engine 2 is prevented from being increased by the lock-up clutch 6 that is maintained in the disengaged state. This suppresses increase of the fuel consumption of the engine 2 at the time when the lock-up clutch 6 is in the hysteresis range D2, which is set in the acceleration slip range D.

(2) When the accelerator operating amount is increased to a value greater than 0 and the vehicle speed is raised, the condition value moves from the disengagement range B to the hysteresis range D2 of the acceleration slip range D and the acceleration slip executing command is generated. Afterwards, if the transmission 4 is shifted up to a higher gear, the acceleration slip range D is changed to a range corresponding to the gear to which the transmission 4 has been shift, and is displaced in the direction of greater vehicle speed from the acceleration slip range D prior to the shift of gear, in response to the vehicle speed. This may maintain the current condition value in the hysteresis range D2, and is likely to lead to a state in which the condition value is in the hysteresis range D2 and the acceleration slip executing command is made. Therefore, when the condition value is in the hysteresis range D2 and the lock-up clutch 6 is in the disengaged state, the fuel consumption of the engine 2 is likely to be increased. However, the present embodiment reliably eliminates this problem and further pronouncedly ensures the advantage (1).

(3) When the time measured by the counter C1 reaches the determination value, the fixation of the acceleration slip executing command is canceled. Correspondingly, the acceleration slip stopping command for the lock-up clutch 6 is generated. In this state, the current condition value is in the deceleration slip range C. Accordingly, the lock-up clutch 6 is switched to the deceleration slip state.

When the lock-up clutch 6 is actuated such that the state of the lock-up clutch 6 is switched to the deceleration slip state, the greater the determination value, in other words, the longer the time required for canceling the fixation of the acceleration slip executing command, the greater the influence on the operation of the lock-up clutch 6 becomes.

Accordingly, if it is not very necessary to prolong the time to fix the acceleration slip executing command, it is preferable to cancel the fixation of the acceleration slip executing command quickly, thus suppressing the influence of such fixation on the above-described operation of the lock-up clutch 6.

Considering this fact, if the accelerator operating amount drops to 0 with the current condition value in the hysteresis range D2 and the acceleration slip executing command maintained, the determination value is determined in accordance with the acceleration of the vehicle at the time immediately before the accelerator operating amount has become 0.

Specifically, if the acceleration of the vehicle increases toward the acceleration a, which is the acceleration most frequently used in the range of change, the determination value X becomes greater as the acceleration becomes greater. As the acceleration is increased, the time in which the accelerator operating amount is maintained at 0 after having been decreased to 0 is prolonged. Specifically, if the accelerator operating amount is quickly increased to rapidly accelerate the vehicle and then decreased to 0 to adjust the vehicle speed in such a manner as to obtain a constant vehicle speed, the accelerator operating amount is maintained at 0 for a prolonged time. In accordance with this tendency, the determination value is set in a variable manner. Accordingly, the command regarding the acceleration slip state of the lock-up clutch 6 is fixed as the acceleration slip executing command for an optimal period of time, which is determined with the above-described fact taken into consideration.

After the acceleration of the vehicle reaches the acceleration a, which is the acceleration most frequently used in the range of change, the determination value becomes smaller as the acceleration of the vehicle becomes higher. In this state, it is not very necessary to prolong the time in which the acceleration slip executing command is fixed. Accordingly, the determination value decreases as the acceleration increases. As the determination value becomes smaller, the time necessary for canceling the fixation of the acceleration slip executing command becomes shorter after the accelerator operating amount is decreased to 0. This reduces the influence of the fixation of the acceleration slip executing command on the operation to switch the lock-up clutch 6 to the deceleration slip state in accordance with the deceleration slip range C, after the fixation of the acceleration slip executing command is canceled and the acceleration slip stopping command is generated as the command regarding the acceleration slip state of the lock-up clutch 6. Accordingly, by setting the determination value in the variable manner as has been described, the influence of the fixation of the acceleration slip executing command on the operation to switch the lock-up clutch 6 to the deceleration slip state is suppressed.

The above-described embodiment may be modified to, for example, the forms described below.

The direct disengagement range A, the disengagement range B, the deceleration slip range C, and the acceleration slip range D (including the ranges D1, D2) do not necessarily have to be changed in correspondence with of the gear of the transmission 4. Even in this case, the condition that causes the problems described in the above embodiment, that is, the condition in which the current condition value is in the hysteresis range D2 and the acceleration slip executing command is made, may occur. Specifically, the condition may happen when, with the gear of the transmission 4 maintained constant, the condition value enters the range D1, which is the range of the acceleration slip range D other than the hysteresis range D2, and then returns to the hysteresis range D2 and is maintained in the hysteresis range D2.

The determination value may become gradually greater or be maintained constant as the acceleration of the vehicle becomes greater than the acceleration a illustrated in FIG. 8, which is the most frequently used acceleration.

The determination value may be varied in accordance with the average of the acceleration of the vehicle.

The determination value may be set variably in accordance with the drive force of the vehicle, instead of the acceleration. In this case, the drive force of the vehicle is estimated based on the intake air amount and the fuel injection amount of the engine 2. The determination value is thus set in a variable manner based on the estimated drive force. The determination value changes according to changes of the drive force of the vehicle in the same manner as changes of the determination value in accordance with changes of the acceleration.

An optimal value determined through experiments or the like may be employed as the determination value.

What is claimed is:

1. A controller for a lock-up clutch that is capable of directly engaging an engine-side component of a torque converter mounted in a vehicle with a transmission-side component of the torque converter, wherein a direct engagement range, in which the lock-up clutch is held in a directly engaged state, a disengagement range, in which the lock-up clutch is held in a disengaged state, and an acceleration slip range and a deceleration slip range, in each of which the lock-up clutch is held in a slip state, are set in correspondence with an accelerator operating amount and a vehicle speed, the acceleration slip range being set between the direct engagement range corresponding to higher vehicle speeds and the disengagement range corresponding to lower vehicle speeds, the deceleration slip range being a range corresponding to a state where the accelerator operating amount is 0 and being adjacent to the acceleration slip range, and wherein the controller switches the lock-up clutch to one of the directly engaged state, the disengaged state, and the slip states depending on which of the ranges a condition value determined by a current accelerator operating amount and a current vehicle speed falls in, the controller comprising:

a command section that generates a command regarding an actuation state of the lock-up clutch in accordance with the condition value, wherein the command section generates an acceleration slip executing command when the current condition value is in a range in the acceleration slip range other than a hysteresis range, which is set for lower vehicle speeds in the acceleration slip range, wherein the command section generates an accelerating slip stopping command when the current condition value is outside the acceleration slip range, wherein, when the condition value is in the hysteresis range of the acceleration slip range, the command section maintains one of the acceleration slip executing command and the acceleration slip stopping command that was made at the time immediately before the current condition value entered the hysteresis range;

a control section that controls the actuation state of the lock-up clutch, wherein the control section switches the lock-up clutch to the acceleration slip state when the current condition value is in the acceleration slip range and the command section generates the acceleration slip executing command, and wherein the control section switches the lock-up clutch to the disengaged state when the current condition value is in the hysteresis state and the command section generates the acceleration slip stopping command;

a time measurement section that starts to measure time when the accelerator operating amount drops to 0 in a state where the current condition value is in the hysteresis range and the command section generates the acceleration slip executing command, and wherein the time measurement section stops measurement of time and resets the measured time to 0 when the accelerator operating amount is increased to a value greater than 0; and a command fixing section that fixes the command of the command section as the acceleration slip executing command in the period from when the time measurement section starts the measurement of time to when the time measured by the time measurement section reaches a determination value, the command fixing section canceling the fixation of the acceleration slip executing command when the accelerator operating amount is increased to the value greater than 0 or the measured time reaches the determination value.

2. The controller according to claim 1, wherein the acceleration slip range and the hysteresis range are set at mutually offset positions in a direction of change of vehicle speed and for respective gears of the transmission.

3. The controller according to claim 2, wherein the determination value is set based on an acceleration of the vehicle at the time immediately before the accelerator operating amount drops 0, the determination value becoming greater as the acceleration becomes greater.

4. The controller according to claim 2, wherein the determination value is maximized when the acceleration of the vehicle is a most frequently used acceleration, which is an acceleration used most frequently in its range of change, wherein, when the acceleration is less than the most frequently used acceleration, the determination value becomes greater as the acceleration of the vehicle becomes greater, and wherein, when the acceleration is greater than the most frequently used acceleration, the determination value becomes smaller as the acceleration of the vehicle becomes greater.

* * * * *